United States Patent
Parrish et al.

(10) Patent No.: US 11,130,175 B2
(45) Date of Patent: Sep. 28, 2021

(54) SPHERICAL METALLIC POWDER BLENDS AND METHODS FOR MANUFACTURING THE SAME

(71) Applicant: The Boeing Company, Chicago, IL (US)

(72) Inventors: Catherine J. Parrish, San Jose dos Campos (BR); James D. Cotton, Issaquah, WA (US)

(73) Assignee: The Boeing Company, Chicago, IL (US)

(*) Notice: Subject to any disclaimer, the term of this patent is extended or adjusted under 35 U.S.C. 154(b) by 424 days.

(21) Appl. No.: 15/874,134

(22) Filed: Jan. 18, 2018

(65) Prior Publication Data
US 2019/0217389 A1   Jul. 18, 2019

(51) Int. Cl.
| | |
|---|---|
| B22F 9/04 | (2006.01) |
| B22F 1/00 | (2006.01) |
| C22C 1/04 | (2006.01) |
| B22F 9/00 | (2006.01) |
| B33Y 70/00 | (2020.01) |
| B22F 10/70 | (2021.01) |

(52) U.S. Cl.
CPC .............. B22F 9/04 (2013.01); B22F 1/0003 (2013.01); B22F 1/0048 (2013.01); C22C 1/0458 (2013.01); B22F 10/70 (2021.01); B22F 2009/001 (2013.01); B22F 2009/041 (2013.01); B22F 2301/205 (2013.01); B22F 2998/10 (2013.01); B22F 2999/00 (2013.01); B33Y 70/00 (2014.12)

(58) Field of Classification Search
None
See application file for complete search history.

(56) References Cited

U.S. PATENT DOCUMENTS

| | | | |
|---|---|---|---|
| 8,449,646 B1 | 5/2013 | Lim et al. | |
| 9,669,464 B1 * | 6/2017 | Zhang | B22F 9/22 |
| 2007/0221635 A1 * | 9/2007 | Boulos | H05H 1/42 |
| | | | 219/121.59 |

(Continued)

FOREIGN PATENT DOCUMENTS

| | | | |
|---|---|---|---|
| CN | 101850424 A | * | 10/2010 |
| EP | 2 832 528 | | 2/2015 |

(Continued)

OTHER PUBLICATIONS

English translation of CN 101850424 (originally published Oct. 6, 2021) from Espacenet.*

(Continued)

*Primary Examiner* — George Wyszomierski
(74) *Attorney, Agent, or Firm* — Walters & Wasylyna LLC

(57) ABSTRACT

A method for manufacturing a spherical metallic powder blend using a metallic starting material, the method including steps of grinding the metallic starting material to yield an intermediate powder, spheroidizing the intermediate powder to yield a first spherical powder component, and mixing the first spherical powder component with a second spherical powder component, wherein the first spherical powder component and the second spherical powder component have substantially the same chemical composition.

20 Claims, 2 Drawing Sheets

(56) References Cited

U.S. PATENT DOCUMENTS

2015/0034123 A1* 2/2015 Pressacco ................. B08B 5/02
                                                    134/10
2016/0074942 A1   3/2016 Fang et al.
2018/0354032 A1* 12/2018 Motchenbacher ..... B33Y 70/00

FOREIGN PATENT DOCUMENTS

KR      20170118302       10/2017
WO    WO 2018/217896      11/2018
WO    WO 2019/140048 A1 *  7/2019

OTHER PUBLICATIONS

K. Thejane et al: "Characterisation and Monitoring of T16AL4V (ELI) Powder Used in Different Selective Laser Melting Systems," South African Journal of Industrial Engineering, vol. 28, pp. 161-171 (Nov. 2017).

V. Petrovic et al: "Powder recyclability in electron beam melting for aeronautical use," Aircraft Engineering and Aerospace Technology: An International Journal, vol. 87, Issue: 2, pp. 147-155, https://doi.org/10.11081/AEAT-11-2013-0212 (2015).

European Patent Office, International Search Report and Written Opinion, App. No. PCT/US2018/067785 (Apr. 11, 2019).

* cited by examiner

SPHERICAL METALLIC POWDER BLENDS AND METHODS FOR MANUFACTURING THE SAME

FIELD

This application relates to spherical metallic powder blends and, more particularly, to blends of spherical metallic powders having target oxygen concentrations.

BACKGROUND

Titanium-based alloys typically exhibit high strength-to-weight ratios, excellent corrosion resistance, and high-temperature properties. Therefore, titanium-based alloys, such as Ti-6Al-4V, are commonly used in the aerospace industry, such as to manufacture various aircraft components and the like.

Titanium-based alloys are relatively expensive and can be difficult to machine into complex parts that meet aerospace specifications. This has led the aerospace industry to the development of net-shape (or near net-shape) technologies, including additive manufacturing processes which reduce the amount of machining required.

While additive manufacturing may consume less materials per component, as compared to traditional subtractive manufacturing processes, the particular feedstock requirements for additive manufacturing tend to increase costs, which can offset cost savings associated with additive manufacturing. For example, due to flowability requirements, as well as the need for uniformity and high-density packing, spherical metallic powders are often used for additive manufacturing. In the case of titanium-based alloys, some oxygen can beneficially improve mechanical properties, but excess oxygen can have a detrimental effect, such as a reduction in ductility (embrittlement) and lower toughness at a given strength. Therefore, industry specifications generally require spherical titanium powders having a threshold/maximum oxygen concentration, such as at most 2000 ppm (0.2 percent by weight) oxygen for Ti-6Al-4V. As of 2017, the unit cost for high quality, spherical Ti-6Al-4V powder having approximately 2000 ppm oxygen can exceed $100 per pound.

Accordingly, those skilled in the art continue with research and development efforts in the field of spherical metallic powders, including spherical metallic powders suitable for use in additive manufacturing processes.

SUMMARY

In one aspect, the disclosed method for manufacturing a spherical metallic powder includes (1) grinding a metallic starting material to yield an intermediate powder, (2) spheroidizing the intermediate powder to yield a first spherical powder component, and (3) mixing the first spherical powder component with a second spherical powder component, wherein the first spherical powder component and the second spherical powder component have substantially the same chemical composition.

In another aspect, the disclosed method for manufacturing a spherical metallic powder includes mixing a first spherical powder component with a second spherical powder component, wherein the first spherical powder component comprises titanium and has an oxygen concentration ranging from about 2100 ppm to about 4000 ppm, and wherein the second spherical powder component comprises titanium and has an oxygen concentration of at most about 1800 ppm.

In one aspect, the disclosed spherical metallic powder blend is the product of a method that includes (1) grinding a metallic starting material to yield an intermediate powder, (2) spheroidizing the intermediate powder to yield a first spherical powder component, and (3) mixing the first spherical powder component with a second spherical powder component, wherein the first spherical powder component and the second spherical powder component have substantially the same chemical composition.

In another aspect, the disclosed spherical metallic powder blend includes a mixture of a first spherical powder component and a second spherical powder component, wherein the first spherical powder component comprises titanium and has an oxygen concentration ranging from about 2100 ppm to about 4000 ppm, and wherein the second spherical powder component comprises titanium and has an oxygen concentration of at most about 1800 ppm.

Other aspects of the disclosed spherical metallic powder blends and methods for manufacturing the same will become apparent from the following detailed description, the accompanying drawings and the appended claims.

DETAILED DESCRIPTION

Disclosed are spherical metallic powder blends and methods for manufacturing the same. The spherical metallic powder blends produced by the disclosed methods can have oxygen concentrations at or below threshold values (e.g., at most 2000 ppm for Ti-6Al-4V), yet can be less expensive than comparable low-oxygen spherical metallic powders that are commercially available.

Figure 1:
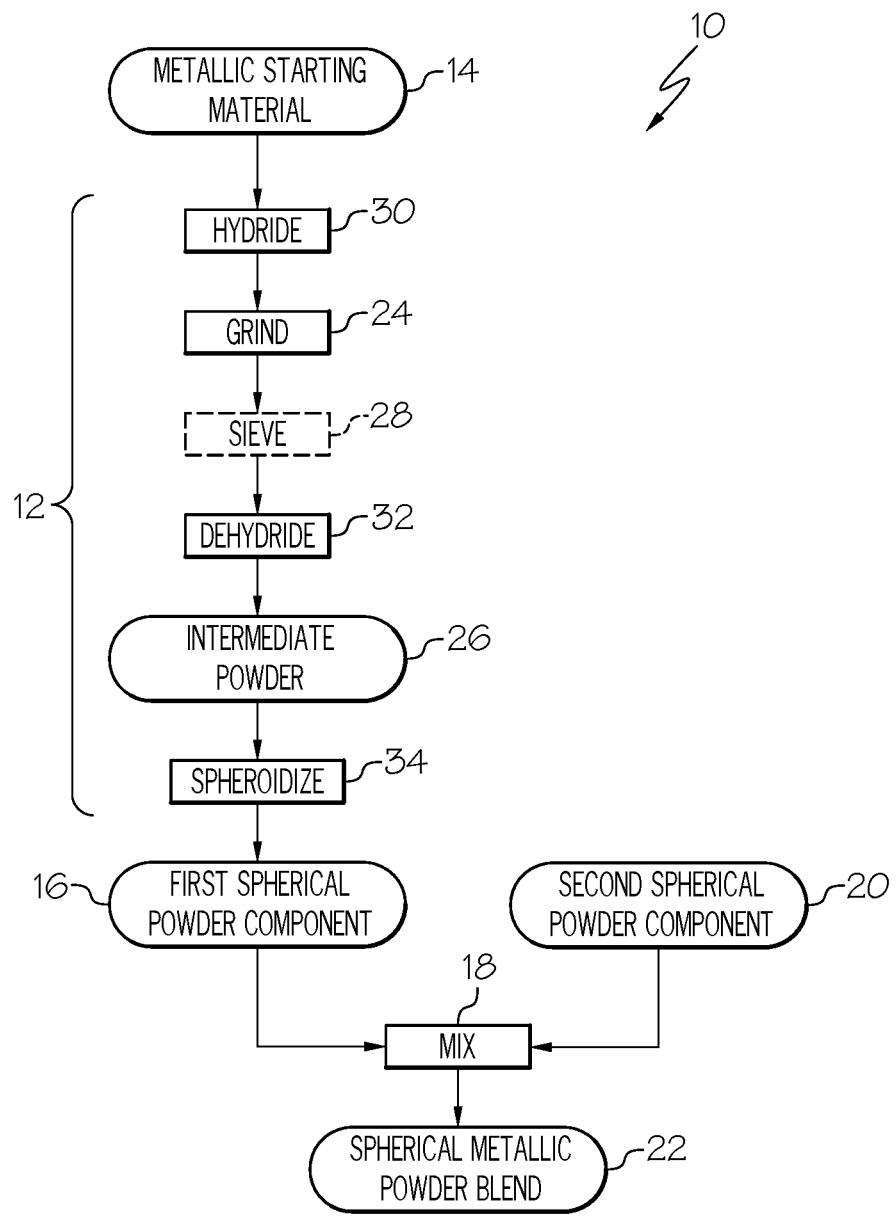
FIG. 1 is a flow diagram depicting one aspect of the disclosed method for manufacturing a spherical metallic powder blend.

FIG. 1 depicts one aspect of the disclosed method 10 for manufacturing a spherical metallic powder blend. In general, the method 10 includes processing 12 a metallic starting material 14 to yield a first spherical powder component 16 and then mixing 18 the first spherical powder component 16 with a second spherical powder component 20 to yield a spherical metallic powder blend 22. The chemical composition of the second spherical powder component 20 can be substantially the same as the chemical composition of the first spherical powder component 16. However, the oxygen concentration of the second spherical powder component 20 can be substantially different from (e.g., less than) the oxygen concentration of the first spherical powder component 16. Therefore, the first spherical powder component 16 can be mixed 18 with the second spherical powder component 20 at an appropriate ratio to yield the spherical metallic powder blend 22 having an oxygen concentration at or below a threshold value. With appropriate selection of the oxygen concentration threshold value, the spherical metallic powder blend 22 can be used to manufacture parts, such as by way of additive manufacturing or other powder metallurgy techniques, without sacrificing ductility and toughness/strength.

Compositionally, the metallic starting material 14—and thus the second spherical powder component 20 and the resulting spherical metallic powder blend—can be titanium or a titanium alloy. As one specific, non-limiting example, the metallic starting material 14 can be Ti-6Al-4V. While the present disclosure focuses on titanium alloys, specifically Ti-6Al-4V, those skilled in the art will appreciate that other metals or metal alloys, such as zirconium alloys, magnesium alloys, nickel alloys and the like, can be used as the metallic starting material 14 of the disclosed method 10 without departing from the scope of the present disclosure.

The metallic starting material 14 can have a relatively high oxygen concentration (high relative to the oxygen concentration of the second spherical powder component 20), such as an oxygen concentration that exceeds the maximum oxygen concentration threshold for the particular chemical composition, as specified/established by industry standards (e.g., AMS 4911 and AMS 4998). For example, in the case of Ti-6Al-4V, the metallic starting material 14 can have an oxygen concentration greater than 2000 ppm, which is in excess of acceptable/threshold levels when mechanical properties (ductility and toughness/strength) of resulting manufactured parts/articles are a concern. In one expression, the oxygen concentration of the metallic starting material 14 can be within the range spanning from about 2100 ppm to about 4000 ppm. In another expression, the oxygen concentration of the metallic starting material 14 can be within the range spanning from about 2100 ppm to about 2300 ppm.

Various techniques can be used to measure oxygen concentration, such as the oxygen concentration of the metallic starting material 14, the first spherical powder component 16, the second spherical powder component 20 and/or the spherical metallic powder blend 22, without departing from the scope of the present disclosure. As one specific, non-limiting example, oxygen concentration can be measured in accordance with ASTM E1409-13 ("Standard Test Method for Determination of Oxygen and Nitrogen in Titanium and Titanium Alloys by Inert Gas Fusion").

In one particular implementation, the metallic starting material 14 can be swarf. As such, the process that produced the swarf (e.g., machining, turning, grinding or the like) may have resulted in the relatively high oxygen concentration, though the reason for the relatively high oxygen concentration of the metallic starting material 14 is not limiting. Those skilled in the art will appreciate that recycling swarf as the metallic starting material 14 of the disclosed method 10 can offset demand for more expensive virgin material that has low oxygen concentrations, thereby providing an opportunity for significant cost savings, particularly when the swarf is generated in-house or obtained at low (or no) cost.

Still referring to FIG. 1, processing 12 of the metallic starting material 14 can include grinding 24 the metallic starting material 14 to yield an intermediate powder 26. The grinding 24 can convert the metallic starting material 14 into a powder (the intermediate powder 26) having the desired physical properties (e.g., desired average particle size and distribution), which can depend on numerous factors, such as the intended use of the spherical metallic powder blend 22.

Various techniques for grinding 24 can be used without departing from the scope of the present disclosure. As one non-limiting example, the grinding 24 can be performed in a planetary mill. As another non-limiting example, the grinding 24 can be performed in a roller mill. As yet another non-limiting example, the grinding 24 can be performed in a ball mill. Planetary mills, roller mills and ball mills are capable of producing an intermediate powder 26 having a particle size distribution suitable for, among other things, additive manufacturing.

When the spherical metallic powder blend 22 is intended for use in an additive manufacturing process, the grinding 24 can be performed such that the intermediate powder 26 has a particle size distribution that facilitates tight packing. In one expression, the grinding 24 can be performed such that the intermediate powder 26 has an average particle size between about 5 µm and about 500 µm. In another expression, the grinding 24 can be performed such that the intermediate powder 26 has an average particle size between about 10 µm and about 100 µm.

Optionally, the powder produced by the grinding 24 can be sieved 28 to obtain a desired particle size distribution. For example, sieving 28 can yield an intermediate powder 26 having a narrower particle size distribution, which can increase the density of, and improve the surface quality and mechanical properties of, resulting additively manufactured parts/articles. In one expression, sieving 28 can yield an intermediate powder 26 having a particle size distribution wherein at least 40 percent of the particles of the intermediate powder 26 have a particle size within (+/−) 20 percent of the average particle size. In another expression, sieving 28 can yield an intermediate powder 26 having a particle size distribution wherein at least 60 percent of the particles of the intermediate powder 26 have a particle size within (+/−) 20 percent of the average particle size. In yet another expression, sieving 28 can yield an intermediate powder 26 having a particle size distribution wherein at least 80 percent of the particles of the intermediate powder 26 have a particle size within (+/−) 20 percent of the average particle size.

Optionally, such as in the case of titanium alloys (e.g., Ti-6Al-4V), the metallic starting material 14 can be hydrided in a hydriding step 30 prior to grinding 24, thereby rendering the metallic starting material 14 more brittle and susceptible to grinding 24. For example, the metallic starting material 14 can be hydrided in a hydriding step 30 by heating the metallic starting material 14 in the presence of hydrogen gas (e.g., in a tube furnace) to an elevated temperature (e.g., 600-700° C.) for a period of time (e.g., 24 hours).

When a hydriding step 30 is performed, then a corresponding dehydriding step 32 can also be performed. The dehydriding 32 can be performed after grinding 24, and either before or after the optional sieving 28, thereby yielding the intermediate powder 26. For example, dehydriding 32 can be performed under vacuum at an elevated temperature (e.g., 550-700° C.) for a period of time (e.g., 72 hours).

Still referring to FIG. 1, processing 12 of the metallic starting material 14 can further include spheroidizing 34 the intermediate powder 26 to yield the first spherical powder component 16. Therefore, the particles of the first spherical powder component 16 can be substantially spherical. As used herein, "spherical" does not require perfect sphericity, but rather means "substantially spherical."

Various techniques can be used for spheroidizing 34 the intermediate powder 26 without departing from the scope of the present disclosure. In one particular implementation, spheroidizing 34 can include introducing the particles of the intermediate powder 26 to a plasma, such as an induction plasma, to quickly heat and melt the particles, followed by cooling. For example, a TEKSPHERO 200™, which is commercially available from Tekna Plasma Systems Inc. of Quebec, Canada, can be used for spheroidizing 34 the intermediate powder 26 using an induction plasma.

The first spherical powder component 16 produced by processing 12 of the metallic starting material 14 will retain the chemical composition of the metallic starting material 14 or can have an even higher oxygen concentration (e.g., due to the grinding 24). Furthermore, like the metallic starting material 14, the first spherical powder component 16 can have a relatively high oxygen concentration. Therefore, the first spherical powder component 16 is mixed 18 with the second spherical powder component 20 to yield the spherical metallic powder blend 22.

The second spherical powder component 20 can be compositionally the same as the first spherical powder component 16, and can include particles that are substantially spherical, like the first spherical powder component 16. However, the second spherical powder component 20 can have a relatively low oxygen concentration (low relative to the oxygen concentration of the first spherical powder component 16), such as an oxygen concentration that is at or below the maximum oxygen concentration threshold for the particular chemical composition, as specified/established by industry standards (e.g., AMS 4911 and AMS 4998). For example, in the case of Ti-6Al-4V, the second spherical powder component 20 can have an oxygen concentration less than 2000 ppm, which can contribute to increased ductility and greater toughness at a given strength. In one expression, the oxygen concentration of the second spherical powder component 20 can be at most about 1900 ppm. In one expression, the oxygen concentration of the second spherical powder component 20 can be at most about 1800 ppm. In another expression, the oxygen concentration of the second spherical powder component 20 can be within the range spanning from about 800 ppm to about 1800 ppm. In yet another expression, the oxygen concentration of the second spherical powder component 20 can be within the range spanning from about 900 ppm to about 1100 ppm.

The second spherical powder component 20 can be obtained from various sources. As one example, the second spherical powder component 20 can be purchased from a supplier or commercial source as virgin material. As another example, the second spherical powder component 20 can be manufactured using a traditional gas atomization technique. As yet another example, the second spherical powder component 20 can be manufactured using a traditional plasma rotating electrode process.

The mixing 18 can be performed at a first spherical powder component-to-second spherical powder component ratio (e.g., 1:1, 2:1, etc.) that yields a spherical metallic powder blend 22 having the desired oxygen concentration. In other words, the spherical metallic powder blend 22 can include a first quantity of the first spherical powder component 16 and a second quantity of the second spherical powder component 20, and the first quantity and the second quantity can be the same or different. In the case of Ti-6Al-4V, the first quantity and the second quantity can be selected such that the resulting spherical metallic powder blend 22 has an oxygen concentration of at most about 2000 ppm.

THEORETICAL EXAMPLES

Two "first spherical powder components" (Component 1A and Component 1B) can be prepared from Ti-6Al-4V swarf by processing 12 in accordance with the disclosed method 10. For example, Component 1A will have an oxygen concentration of about 4000 ppm and cost about $48 per pound to produce, while Component 1B will have an oxygen concentration of about 2200 ppm and cost about $50 per pound to produce.

Two "second spherical powder components" (Component 2A and Component 2B) can be obtained from various commercial sources. For example, Component 2A can be virgin Ti-6Al-4V having an oxygen concentration of about 1800 ppm and costing about $100 per pound, while Component 2B can be virgin Ti-6Al-4V having an oxygen concentration of about 1000 ppm and costing about $105 per pound.

Various mixtures can be prepared, including (1) various mixtures of Component 1A with Component 2A (see Table 1); (2) various mixtures of Component 1B with Component 2A (see Table 2); various mixtures of Component 1A with Component 2B (see Table 3); and (4) various mixtures of Component 1B with Component 2B (see Table 4). The calculations presented in the tables below followed a rule-of-mixtures methodology.

TABLE 1

Blend of 1A and 2A

| % 1A | Cost ($) | Oxygen (ppm) | Cost Reduction (%) |
|---|---|---|---|
| 0 | 100 | 1800 | 0 |
| 9 | 95.32 | 1998 | 5 |
| 50 | 74 | 2900 | 26 |
| 75 | 61 | 3450 | 39 |
| 100 | 48 | 4000 | 52 |

TABLE 2

Blend of 1B and 2A

| % 1B | Cost ($) | Oxygen (ppm) | Cost Reduction (%) |
|---|---|---|---|
| 0 | 100 | 1800 | 0 |
| 16 | 92 | 1864 | 8 |
| 50 | 75 | 2000 | 25 |
| 75 | 62.5 | 2100 | 38 |
| 100 | 50 | 2200 | 50 |

TABLE 3

Blend of 1A and 2B

| % 1A | Cost ($) | Oxygen (ppm) | Cost Reduction (%) |
|---|---|---|---|
| 0 | 105 | 1000 | 0 |
| 33 | 86.19 | 1990 | 18 |
| 50 | 76.5 | 2500 | 27 |
| 75 | 62.25 | 3250 | 41 |
| 100 | 48 | 4000 | 54 |

TABLE 4

Blend of 1B and 2B

| % 1B | Cost ($) | Oxygen (ppm) | Cost Reduction (%) |
|---|---|---|---|
| 0 | 105 | 1000 | 0 |
| 25 | 91.25 | 1300 | 13 |
| 50 | 77.5 | 1600 | 26 |
| 75 | 63.75 | 1900 | 39 |
| 83 | 59.35 | 1996 | 43 |
| 100 | 50 | 2200 | 52 |

Accordingly, these theoretical examples show that various mixtures can yield a Ti-6Al-4V spherical metallic powder blend having an oxygen concentration of at most about 2000 ppm, which can yield parts/articles exhibiting increased ductility and greater toughness at a given strength, as compared to similar parts/articles manufactured using Ti-6Al-4V spherical metallic powder having an oxygen concentration substantially higher than 2000 ppm. Furthermore, these theoretical examples show that various mixtures offer a cost reduction as compared to using only virgin powder.

Figure 2:
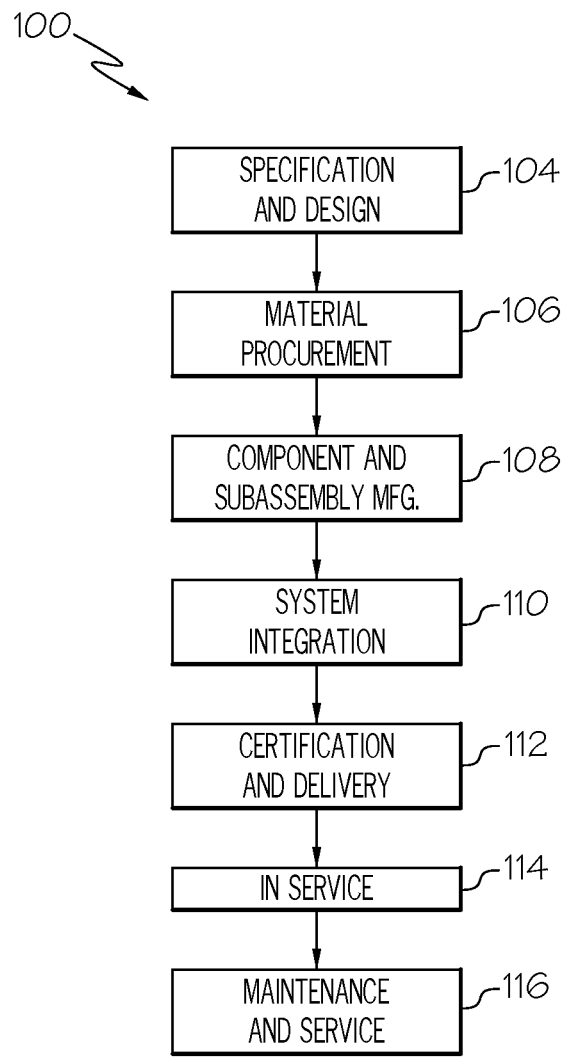
FIG. 2 is a flow diagram of an aircraft manufacturing and service methodology.
Figure 3:
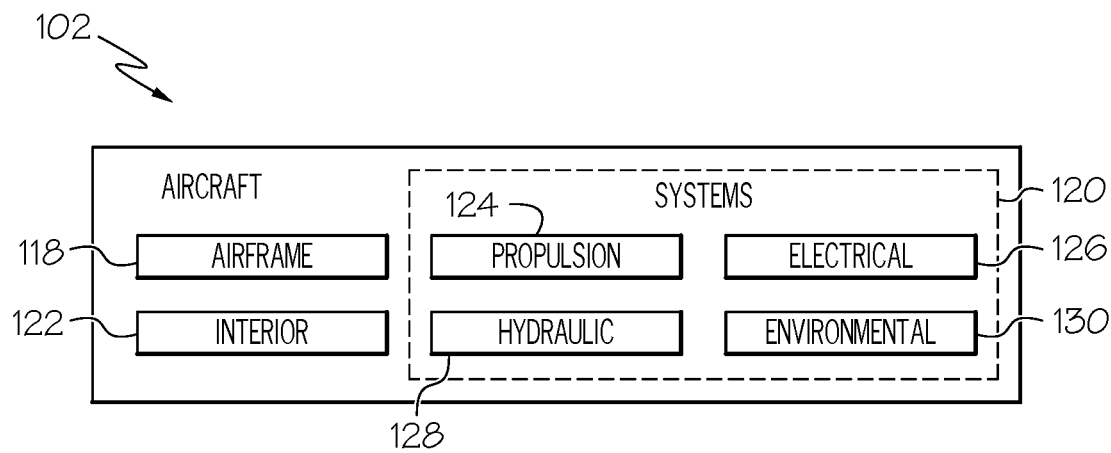
FIG. 3 is a block diagram of an aircraft.

Examples of the disclosure may be described in the context of an aircraft manufacturing and service method 100, as shown in FIG. 2, and an aircraft 102, as shown in FIG. 3. During pre-production, the aircraft manufacturing and service method 100 may include specification and design 104 of the aircraft 102 and material procurement 106. During production, component/subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116, which may also include modification, reconfiguration, refurbishment and the like.

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 3, the aircraft 102 produced by example method 100 may include an airframe 118 with a plurality of systems 120 and an interior 122. Examples of the plurality of systems 120 may include one or more of a propulsion system 124, an electrical system 126, a hydraulic system 128, and an environmental system 130. Any number of other systems may be included.

The disclosed spherical metallic powder blends and methods for manufacturing the same may be employed during any one or more of the stages of the aircraft manufacturing and service method 100. As one example, components or subassemblies corresponding to component/subassembly manufacturing 108, system integration 110, and or maintenance and service 116 may be fabricated or manufactured using the disclosed spherical metallic powder blends. As another example, the airframe 118 may be constructed using the disclosed spherical metallic powder blends. Also, one or more apparatus examples, method examples, or a combination thereof may be utilized during component/subassembly manufacturing 108 and/or system integration 110, for example, by substantially expediting assembly of or reducing the cost of an aircraft 102, such as the airframe 118 and/or the interior 122. Similarly, one or more of system examples, method examples, or a combination thereof may be utilized while the aircraft 102 is in service, for example and without limitation, to maintenance and service 116.

The disclosed spherical metallic powder blends and methods for manufacturing the same are described in the context of an aircraft; however, one of ordinary skill in the art will readily recognize that the disclosed spherical metallic powder blends and methods for manufacturing the same may be utilized for a variety of applications. For example, the disclosed spherical metallic powder blends may be implemented in various types of vehicle including, for example, helicopters, passenger ships, automobiles, marine products (boat, motors, etc.) and the like. Various non-vehicle applications, such as medical applications, are also contemplated.

Although various aspects of the disclosed spherical metallic powder blends and methods for manufacturing the same have been shown and described, modifications may occur to those skilled in the art upon reading the specification. The present application includes such modifications and is limited only by the scope of the claims.

What is claimed is:

1. A method for manufacturing a spherical metallic powder blend from a metallic starting material, the method comprising:
    grinding the metallic starting material to yield an intermediate powder;
    spheroidizing the intermediate powder to yield a first spherical powder component; and
    mixing a first quantity of the first spherical powder component with a second quantity of a second spherical powder component, wherein the first spherical powder component and the second spherical powder component both comprise titanium, but have different oxygen concentrations, and wherein the mixing the first spherical powder component with the second spherical powder component comprises mixing at a first spherical powder component-to-second spherical powder component ratio that yields a mixture having an oxygen concentration below about 2000 ppm.

2. The method of claim 1 wherein the first spherical powder component has an oxygen concentration greater than 2000 ppm and the second spherical powder component has an oxygen concentration of at most 1800 ppm.

3. The method of claim 2 wherein the first spherical powder component has an oxygen concentration ranging from about 2100 ppm to about 4000 ppm.

4. The method of claim 2 wherein the first spherical powder component has an oxygen concentration ranging from about 2100 ppm to about 2300 ppm.

5. The method of claim 2 wherein the second spherical powder component has an oxygen concentration ranging from about 800 ppm to about 1800 ppm.

6. The method of claim 2 wherein the second spherical powder component has an oxygen concentration ranging from about 900 ppm to about 1100 ppm.

7. The method of claim 1 wherein the metallic starting material comprises swarf.

8. The method of claim 1 wherein the grinding the metallic starting material to yield the intermediate powder comprises grinding to achieve an average particle size between about 10 μm and about 100 μm.

9. The method of claim 8 wherein at least 80 percent of powder particles of the intermediate powder have a particle size within 20 percent of the average particle size.

10. The method of claim 1 wherein the grinding is performed in a planetary mill, a ball mill or a roller mill.

11. The method of claim 1 further comprising hydriding the metallic starting material prior to the grinding.

12. The method of claim 11 further comprising dehydriding the intermediate powder prior to the spheroidizing.

13. The method of claim 1 wherein the spheroidizing the intermediate powder comprises introducing the intermediate powder to an induction plasma.

14. The method of claim 1 wherein the mixing the first spherical powder component with the second spherical powder component comprises mixing at a first spherical powder component-to-second spherical powder component ratio of at least 1:1.

15. The method of claim 14 wherein the first spherical powder component-to-second spherical powder component ratio is at least 2:1.

16. The method of claim 1 wherein the first spherical powder component and the second spherical powder component comprise Ti-6Al-4V.

17. A method for manufacturing a spherical metallic powder blend comprising:
- mixing a first quantity of a first spherical powder component with a second quantity of a second spherical powder component, wherein:
- the first spherical powder component comprises titanium and has an oxygen concentration ranging from about 2100 ppm to about 4000 ppm,
- the second spherical powder component comprises titanium and has an oxygen concentration of at most about 1800 ppm, and
- wherein the mixing the first spherical powder component with the second spherical powder component comprises mixing at a first spherical powder component-to-second spherical powder component ratio that yields a mixture having an oxygen concentration below about 2000 ppm.

18. The method of claim 17 wherein both the first spherical powder component and the second spherical powder component comprise Ti-6Al-4V.

19. The method of claim 17 further comprising:
- grinding a metallic starting material to yield an intermediate powder; and
- spheroidizing the intermediate powder to yield the first spherical powder component.

20. The method of claim 17 wherein the second spherical powder component has an oxygen concentration ranging from about 800 ppm to about 1800 ppm.

* * * * *